United States Patent [19]

Rao et al.

[11] 4,091,152

[45] May 23, 1978

[54] LITHIUM SO$_2$ CELL

[75] Inventors: M. L. Bhaskara Rao, Billerica; Carl R. Schlaikjer, Arlington, both of Mass.

[73] Assignee: P.R. Mallory & Co. Inc., Indianapolis, Ind.

[21] Appl. No.: 623,227

[22] Filed: Oct. 17, 1975

Related U.S. Application Data

[62] Division of Ser. No. 388,370, Aug. 16, 1973, Pat. No. 3,953,302.

[51] Int. Cl.$^2$ .................. H01M 6/16; H01M 10/26; C25D 3/56; C25C 1/02
[52] U.S. Cl. .................. 429/105; 204/59 AM; 429/101; 429/194; 429/197
[58] Field of Search .................. 204/59 AM; 429/194, 429/101, 105, 197

[56] References Cited

U.S. PATENT DOCUMENTS

| | | | |
|---|---|---|---|
| 788,315 | 4/1906 | Hoopes | 204/59 AM |
| 3,043,896 | 7/1962 | Herbert et al. | 429/194 |
| 3,493,433 | 2/1970 | Hoffmann | 204/59 AM |
| 3,508,966 | 4/1970 | Eisenberg | 429/197 |
| 3,562,017 | 2/1971 | Lyall | 429/194 |
| 3,567,515 | 3/1971 | Maricle et al. | 429/105 |
| 3,578,500 | 5/1971 | Maricle et al. | 429/194 X |
| 3,726,716 | 4/1973 | Athearn et al. | 429/194 |
| 3,764,385 | 10/1973 | Langer et al. | 429/105 |
| 3,926,669 | 12/1975 | Auborn | 429/196 |

*Primary Examiner*—F.C. Edmundson
*Attorney, Agent, or Firm*—Charles W. Hoffmann; Ronald S. Cornell; Israel Nissenbaum

[57] ABSTRACT

A method, a cell, an electrolyte and an additive for the non-dendritic deposition of lithium is described.

The additive which causes the non-dendritic deposition of lithium from non-aqueous electrolytes and particularly organic electrolytes is a metal, reducible by lithium and capable of forming lithium-rich metallics or alloys.

5 Claims, No Drawings

LITHIUM SO₂ CELL

This is a division, of application Ser. No. 388,370, filed Aug. 16, 1973 now U.S. Pat. No. 3,953,302 issued on Apr. 27, 1976.

FIELD OF THE INVENTION

This invention relates to the deposition of lithium in electrolytic cells and more particularly relates to the nondendritic deposition of lithium from non-aqueous electrolytes.

BACKGROUND OF THE INVENTION

The recent developments in organic electrolyte systems have resulted in a large number of high energy-density primary cells based on lithium alloys. One of the major problems limiting the successful development of rechargeable versions of lithium cells is the nature of the lithium deposit during recharge of such cells. Investigations have indicated that lithium plating occurs in dendritic form in ordinary cells. According to the prior art this nature of the deposit causes a lowering of utilization efficiency and ultimately causes cell shorting. This shorting phenomena limits the cycle life of a rechargeable cell.

An object of this invention is to provide certain addition agents which can be introduced into the electrolyte of such rechargeable lithium cells which will eliminate the dendritic growth of lithium during the electrolytic plating of the lithium from the electrolytes of such cells.

As a further object, this invention provides a method for the non-dendritic plating of lithium from non-aqueous electrolyte systems.

A further object of this invention is to provide a cell and an electrolyte for such a cell which is capable of deposition of lithium in non-dendritic form.

We have discovered that we can eliminate the dendritic growth of lithium plating by incorporating certain addition agents into the electrolyte or into the cell itself.

SUMMARY OF THE INVENTION

We have found that non-dendritic lithium deposits may be achieved in electrolytic cells which comprise a cathode, an anode and a non-aqueous electrolyte, when said electrolyte includes an addition agent comprising a compound selected from the group of compounds consisting of salts, and anionic or cationic complexes of metals reducible by lithium. Such addition agents are those having metal components reducible by lithium which are capable of coplating with lithium at lithium deposition voltages in the form of lithium-rich intermetallics or alloys.

The addition agents of this invention are selected from the group consisting of metals and salts of such lithium reducible metals which are soluble in the electrolyte, said metals being selected from the group of alkaline earth metals, and transition metal elements which are more noble than lithium in said solvent. Among effective metals forming compounds in the form of salts, or anionic or cationic complexes, are the alkaline earth metals including beryllium, magnesium, strontium, barium, and calcium as well as a transition metal element selected from the group consisting of scandium, titanium, mercury, zinc, cadmium, chromium, manganese, iron, cobalt, nickel, copper, yttrium, silver, lanthanum and the other rare earth metals. Compounds of metals such as gallium, indium, thallium, tin, lead, and bismut are additionally included.

Generally, these metallic elements are used in the form of electrolyte-soluble compounds containing any metal reducible by lithium which is present as salts or as a complexed or polynuclear species. All such complexed or polynuclear compounds of these lithium reducible metals will function as suitable addition agents provided that they are soluble in the electrolyte in an amount sufficient to provide an effect against the deposition of lithium in dendritic form.

THE DETAILS OF THE INVENTION

The additives of this invention by virtue of their position in the electromotive series of metals with respect to the particular electrolyte solutions under consideration consist of ions which exchange and/or coplate with lithium to form lithium-rich intermetallics of lithium alloys. The formation of such intermetallics or alloys is responsible for the non-dendritic plating which results from the present invention.

Among the preferred addition agents according to this invention are $CaBr_2$; $CaCl_2$; $Ca(ClO_4)_2$; $ZnBr_2$ and $HgCl_2$. These addition agents are present in low concentration in the electrolyte in comparison to the concentration of lithium salts for plating in said electrolyte. The active components effecting the change in the nature of the lithium electrode deposits are $Ca^{++}$, $Zn^{++}$, and $Hg^{++}$ ions. By virtue of their position in the electromotive series of metals, these ions exchange and/or coplate with lithium to form lithium-rich intermetallics or lithium alloys.

In addition to the salts of calcium, other alkaline earth salts may be used as additives. These include beryllium, magnesium, strontium and barium. In addition to the salts of zinc and mercury, other transition metal salts may be used as additives such as those of the related metal cadmium or from the first row transition elements of the Periodic Table, including scandium, titanium, chromium, manganese, iron, cobalt, nickel or copper, from the second row of transition elements including yttrium or silver or from the third row including lanthanum and the other rare earths. Other metal salts which may be used as additives include; gallium, indium, tellurium, tin, lead and bismuth.

All of the metals which are effective as additives for the purposes of this invention are considered more noble than lithium and would exchange and/or coplate during electrochemical reduction of lithium ions from aprotic medium.

The term salts as used in this invention are the simple combinations of anions and the cations of the metals such as halides, perchlorates, haloborates, halophosphates or haloarsenates of these metals. Included among the salts useful for the purposes of this invention are for example $SrCl_2$, $SrBr_2$, $SrI_2$, $Ba(ClO_4)_2$, $Sc(PF_6)_3$, etc.

While the addition agents have been described as salts, they are not restricted to the salts as defined above. Included within the scope of this example are anionic or cationic complexes. For example calcium may be added to the electrolytes by using a complex salt such as lithium (calcium₂), ethylenediamine tetraacetate, in which the calcium is present in a negatively charged complex or moiety and not as a free ion. Similar, EDTA salts may be prepared from other alkaline earths. In addition, metals such as iron and cobalt may be used as additives in complex salts such as $K_3(Fe(CN)_6)$; $K_4(Fe(CN)_6)$; $(Co(NH_3)_6)$ $Cl_3$;

(Co(NH$_3$)$_5$Cl) Cl$_2$ in which the metal is incorporated as an anionic or cationic complex. In solutions these salts dissociate into charged complex ions. Thus for purposes of this invention, compounds containing any metal reducible by lithium which is present as a complexed or polynuclear species will function as a suitable addition agent.

Further examples of metals which form compounds capable of serving as addition agents include: V, Nb, Mo, Ru, Rh, Pd, Hf, Zr, Ta, W, Re, Os, Ir, Pt, Au, Sn, Sb. Other than the alkaline earths which form complexed compounds applicable as additives are copper and lead which form complex ions suitable for the use as additives according to this invention in the form of complex species such as Cu(I)Cl$_2^-$ or PbCl$_4^{-2}$.

We have discovered that the extent of exchange and/or coplating depends upon factors such as the concentration of the addition agent; the concentration of the lithium salt, the concentration of the addition agent in relation to the concentration of lithium salt in the electrolyte; the exchange current density of the plating; and the difference in the electromotive force between the noble metal and the lithium.

The activity of the alloy or intermetallic compound determines the mixed potential for exchange or overpotential for deposition. It is preferred to have the amount of addition agent included in the alloy or intermetallic to be as small as possible yet large enough to effective non-dendritic plating.

It has been observed that the inclusion of the addition agent in the lithium plating as an intermetallic or alloy may change the activity of the lithium electrode in the cell operating under this invention. The total preferred inclusion of addition agent should be determined so that the resultant electrode will not become more noble than the lithium potential by more than one and one half volt from the normal lithium EMF in the electrolyte. If this limit is exceeded, the practical advantages derived from employing lithium anodes in non-aqueous electrolytic cells would be seriously affected.

The electrolytes according to this invention may be a variety of organic electrolytes comprising a variety of solvents in which are dissolved lithium salts and from which lithium plating may be carried out. Such electrolytes are subject to modification of plating characteristics by the use of the addition agents of this invention. For example, lithium may be plated from solutions of its salts in organic solvents either singly or mixed such as:

(a) Esters of which propylene carbonate is preferred and other esters including alkyl formates, alkyl acetates, butyrates, and also orthoesters such as methyl or ethyl orthoacetate or orthoformate are also useful.

(b) Ethers, of which tetrahydrofuran is preferred but ethers such as methoxymethanes and ethanes, ethers derived from ethylene glycol and polyethylene glycol, cyclic ethers such as dioxane, dioxolane and the like are also useful.

(c) Aldehydes and ketones such as acetaldehyde, acetone and the like are useful.

(d) Nitriles such as acetonitrile, propionitrile, benzonitrile and the like are useful.

(e) Amides and substituted amides such as formamide, N,N dimethylacetamide and the like; and closely related amide like compounds and such as N,N dimethyl methyl carbamate and tetramethylurea.

Also useful as electrolytes are organic solvents, including those described above, in which is dissolved sulfur dioxide in addition to the lithium salt. Sulfur dioxide serves to improve the electrical conductivity of the electrolyte and protects the plated lithium from attack by certain solvents such as acetone and acetonitrile in which the deposited lithium would otherwise be unstable. Lithium salts useful for sources of lithium metal plating are those lithium salts which are soluble in the electrolyte. Among the preferred lithium salts are lithium perchlorate, LiClO$_4$ and lithium chloride (LiCl). Other lithium salts which may be used are LiBr, LiI, LiPF$_6$, LiAsF$_6$, LiBF$_4$, LiBCl$_4$, LiAlCl$_4$.

It has been noted that it is necessary that the exchanged or coplated metal of the addition agent be redissolved upon anodization of the lithium intermetallic or alloy formed during the plating. The presence of the undissolved component of the addition agent on the anode substrate may be sufficient to encourage the reformation of the lithium intermetallic or the lithium alloy with replated lithium and thus ensure non-dendritic deposition even when the electrolyte is exhausted of the addition agent during charge and discharge of a secondary cell anode.

When the addition agent component dissolves upon anodization of the intermetallic or lithium alloy, it may be possible to form in situ the addition agent by starting with the intermetallic or alloy of lithium and anodizing same in the electrolyte. The in situ formed addition agent then continues to effect the non-dendritic lithium deposition during subsequent plating and replating. One manner of effecting this invention is the use of thermally-formed lithium alloys or intermetallic compounds which than may be formed into anodes for use in rechargeable lithium cells.

There has been noted the possibility of utilizing these additives in fused salt baths for the deposition of lithium. This is useful as a first-stage refining of lithium where the presence of the minute amounts of additive in the deposited lithium is non-deleterious.

The invention further will be described by reference to the appended examples. These are intended to show the manner of operation of this invention and are not intended to limit the scope of this invention in any manner or form.

EXAMPLE 1

Addition of 0.25M CaBr$_2$ to electrolyte 'A' that has been developed for Li/SO$_2$ cells (Electrolyte A: 3M LiClO$_4$, acetonitrile: propylene carbonate (PC) (7:3 v/v), saturated with SO$_2$ at room temperature) provides a non-dendritic plating in the course of deposition of lithium at 20 mA/cm$^2$ for ¼ of an hour. Under identical plating conditions, in the absence of CaBr$_2$, the lithium plating from the electrolyte is dendritic in nature. Non-dendritic lithium plating has also been obtained in electrolyte 'A' by replacing the addition agent CaBr$_2$ with CaCl$_2$ and Ca(ClO$_4$)$_2$.

EXAMPLE 2

Addition of 2 grams of ZnBr$_2$ to 100 ml solution of 1M LiClO$_4$ in propylene carbonate provides a solution from which a non-dendritic lithium plating is obtained. In the absence of ZnBr$_2$, lithium plating from 1M LiClO$_4$-PC is of dendritic form.

EXAMPLE 3

Addition of 1 gram of HgCl$_2$ to 100 ml solution of 1M LiClO$_4$-PC minimizes the dendritic nature of the lithium plated from the electrolyte. In the absence of $HgCl_2$, lithium plating from 1M $LiClO_4$-PC is of dendritic nature.

EXAMPLE 4

Addition of 0.1M $CaCl_2$ to 1M LiCl in gamma-butyrolactone saturated with $SO_2$ provides a solution from which a non-dendritic plating of lithium is effected. In the absence of $CaCl_2$, the lithium plating from the electrolyte is of dendritic nature.

Lithium plating conditions used for comparing the nature of electrodeposit or plating in examples (1) to (4) consists of the following. Lithium is deposited onto 1 × 1 cm titanium expanded metal screen at 20 mA for 15 minutes. The nature of the deposit is examined to characterize whether the deposit is dendritic or otherwise.

What is claimed is:

1. A rechargeable cell capable of plating non-dendritic lithium which comprises a sulfur dioxide cathode, a lithium anode, and an aprotic non-aqueous electrolyte, with said electrolyte comprising a non-aqueous solvent having dissolved therein a lithium salt and an addition agent comprising a metal salt which metal is reducible by lithium and capable of coplating therewith, and wherein the concentration of said addition agent does not exceed the amount which will render the plated lithium at least one and a half volts more noble than the normal lithium EMF activity.

2. The cell according to claim 1 wherein said aprotic non-aqueous solvent is an organic solvent.

3. The cell according to claim 1 wherein said metal is selected from the group consisting of Be, Mg, Sr, Bu, Ca, Sc, Ti, Hg, Zn, Cd, Cr, Mn, Fe, Co, Ni, Cu, Y, Ag, Ga, In, Tl, Sn, Pb, Bi, and rare earths.

4. The cell according to claim 1 wherein said anode serves as the site for the deposition of non-dendritic lithium and comprises a lithium-rich intermetallic or alloy of lithium with a metal reducible by lithium.

5. The cell according to claim 1 wherein said addition agent is selected from the group consisting of calcium bromide ($CaBr_2$), zinc bromide ($ZnBr_2$), mercury (II) chloride ($HgCl_2$) and calcium chloride ($CaCl_2$).

* * * * *